(12) United States Patent
Presezzi et al.

(10) Patent No.: US 11,345,859 B2
(45) Date of Patent: May 31, 2022

(54) HYBRID PYROLYSIS SYSTEM AND METHOD

(71) Applicant: BIOFORCE TECH CORPORATION, South San Francisco, CA (US)

(72) Inventors: Dario Presezzi, San Francisco, CA (US); Valentino Villa, Redwood City, CA (US); Marco Mosciarello, San Francisco, CA (US); Stefano Pessina, San Francisco, CA (US); Mattia Bonfanti, Delft (NL)

(73) Assignee: BIOFORCE TECH CORPORATION, Newark, DE (US)

( * ) Notice: Subject to any disclaimer, the term of this patent is extended or adjusted under 35 U.S.C. 154(b) by 0 days.

(21) Appl. No.: 17/255,725

(22) PCT Filed: Jun. 18, 2019

(86) PCT No.: PCT/US2019/037808
§ 371 (c)(1),
(2) Date: Dec. 23, 2020

(87) PCT Pub. No.: WO2020/005647
PCT Pub. Date: Jan. 2, 2020

(65) Prior Publication Data
US 2021/0277311 A1 Sep. 9, 2021

Related U.S. Application Data

(60) Provisional application No. 62/689,201, filed on Jun. 24, 2018.

(51) Int. Cl.
*C10B 47/18* (2006.01)
*C10B 47/44* (2006.01)
(Continued)

(52) U.S. Cl.
CPC ............. *C10B 19/00* (2013.01); *C10B 1/06* (2013.01); *C10B 5/10* (2013.01); *C10B 7/10* (2013.01);
(Continued)

(58) Field of Classification Search
CPC .......... C10B 47/40; C10B 47/44; C10B 1/06; C10B 1/08; C10B 1/10; C10B 7/10; C10J 2200/158
See application file for complete search history.

(56) References Cited

U.S. PATENT DOCUMENTS

| 5,321,191 A | 6/1994 | Alagy et al. |
| 6,861,169 B2 | 3/2005 | Hagan et al. |

(Continued)

OTHER PUBLICATIONS

BFT P-Five Pyrolysis, Jun. 2017.

*Primary Examiner* — Jonathan Luke Pilcher
(74) *Attorney, Agent, or Firm* — Law Offices of Steven W. Weinrieb

(57) ABSTRACT

A system and method for performing pyrolysis comprises a reactor through which organic material is conveyed from an upstream end toward a downstream end and within which said pyrolysis will occur; a combustion chamber fluidically connected to the downstream end of the reactor; an output pipe fluidically connected to the downstream end of the reactor; a capsule surrounding a first part of the reactor and into an internal portion of which heated thermal fluids are disposed for heating the first part of said reactor; and a plurality of electrical resistors disposed around a second part of the reactor for heating the second part of the reactor; whereby, as a result of the pyrolysis occurring within the reactor, the syngas is conducted toward the combustion chamber while the carbonized material is conducted outwardly from the reactor through the output pipe.

4 Claims, 5 Drawing Sheets

(51) Int. Cl.
*C10B 19/00* (2006.01)
*C10B 1/06* (2006.01)
*C10B 5/10* (2006.01)
*C10B 7/10* (2006.01)
*F28D 7/16* (2006.01)
*H02K 7/18* (2006.01)

(52) U.S. Cl.
CPC ............... *C10B 47/44* (2013.01); *F28D 7/16* (2013.01); *H02K 7/1815* (2013.01)

(56) References Cited

U.S. PATENT DOCUMENTS

| | | | |
|---|---|---|---|
| 2002/0189510 A1* | 12/2002 | Kashiwagi | C10J 3/00 110/342 |
| 2003/0010266 A1* | 1/2003 | Ballantine | C10K 1/08 110/229 |
| 2010/0223839 A1* | 9/2010 | Garcia-Perez | C12M 45/20 44/451 |
| 2011/0089015 A1 | 4/2011 | Kelley | |

\* cited by examiner

HYBRID PYROLYSIS SYSTEM AND METHOD

FIELD OF THE INVENTION

Various embodiments of the present invention generally relate to a new and energy-positive method of thermal decomposition of organic materials at elevated temperatures in an inert atmosphere.

BACKGROUND OF THE INVENTION

Pyrolysis is the thermal decomposition of organic materials at elevated temperatures (usually between 450° C. and 900° C.) in an inert atmosphere (absence of oxygen). It involves the change of chemical composition and is irreversible. The pyrolysis produces two main results: a gas (also called "Syngas") and a carbonized material. In the past, several attempts have been made in order to find a way to thermally decompose organic materials at elevated temperatures in an inert atmosphere that could be energy efficient, but until now without success. Moreover, the quality of the result of such decomposition process (which is commonly called pyrolysis), has always been very low and therefore of scarce economic value.

Currently, there are three industrial pyrolysis systems and methods that are used, and all of them have multiple disadvantages that make them inefficient.

The first method and system can be called "Electrically heated pyrolysis": this system and method makes use of electrical resistors to keep the temperature of the reactor where the organic material is inserted in order to have the pyrolysis performed. The advantages of this system and method are the possibility to heat the reactor with simple and inexpensive resistors, and the ability to easily regulate the temperature of the pyrolysis process, which is an important factor when trying to obtain a specific carbonized material. The real downside of this system is the energy consumption. In order to perform the pyrolysis and to keep the desired temperature in the reactor, energy has to be provided to the resistors. Part of this required energy is obtained from the Syngas which is produced as a result of the pyrolysis process: The Syngas is burnt in a combustion chamber, and thanks to the exhaust gas of the combustion and with the help of a heat exchanger, energy is produced. The electricity that can be produced with the syngas combustion is only roughly 50% of the electricity required to obtain the pyrolysis of the organic material, with the result of obtaining a negative energy balance. In order to make this process economically viable, it would be necessary to produce more energy than is required to perform the pyrolysis, but with an electrical pyrolysis system it is actually not possible.

A second method and system to perform the pyrolysis is the so-called "Gas heated pyrolysis". This type of method and system makes use of natural gas or propane to heat and maintain the temperature of the reactor where the organic material is put into. The advantages of this system and method are the possibility to heat the reactor with commercially available natural gas burners, and the ability to generate electricity. The downside also of this system is once again the energy consumption. In order to perform the pyrolysis and to keep the desired temperature in the reactor, gas or propane has to be burnt. The energy recovered from the Syngas combustion can used for other purposes but it a non-economically viable amount of energy if compared to the quantity of natural gas or propane that is required to keep the pyrolysis process in place. Moreover, since the energy comes from an external source (like natural gas), it cannot be recovered in any way or substituted efficiently in order to hear and keep the temperature of the reactor.

A third commonly known way to perform a pyrolysis is the so-called "Exhaust Gas Heated Pyrolysis": this type of system and method contains a combustion chamber for the Syngas, which is there burnt, giving as a result exhaust gas. Such exhaust gas, which has a very high temperature, is used to heat and maintain the temperature of the reactor by building a capsule all around the reactor which is filled with exhaust, high temperature, gas. No electrical resistors are used in this kind of pyrolysis system and method, and no energy is produced from the combustion of the Syngas. The big advantage of this system is however the possibility to heat the reactor and keep the temperature inside it by recirculating exhaust gas, making this part of the process energy neutral or even positive: once the reactor has been heated once, then the exhaust gas generated by the combustion of the Syngas allows the reactor to be re-heated in continuous and to perform the pyrolysis. The huge downside of this system is the difficulty to maintain a specific temperature in the rector: the temperature can be too high or too low. Counterbalancing the temperature through the use of external energy is expensive and strongly diminishes the efficiency of the process. While in principle advantageous, this system and method is actually very expensive. The instability and scarce predictability of the temperatures is such, unless adequately balanced, that the carbonized material resulting from the pyrolysis is of very low quality, unless a lot of energy is consumed to keep a balanced temperature in the reactor.

The above described three methods and systems are the most common and commercially exploitable ways to perform a pyrolysis, but they all have serious problems that impair their efficiency and so their commercial viability.

SUMMARY OF THE DESCRIPTION

Embodiments of the disclosure include a method to efficiently perform the pyrolysis of organic material. Such method may be performed through the injection of organic material in a container, called reactor, which is heated to a desired temperature ranging between 450° C. and 900° C., or less. In an embodiment of the disclosure, after the pyrolysis in the reactor has been performed at a given temperature, the organic material is then separated between Syngas and carbonized material, and the Syngas is burnt in a combustion chamber. In one of the embodiments of the disclosure, the exhaust gas that is produced after the combustion is then used to heat thermal fluids and, thanks to a thermal fluid exchanger, heated fluids are sent in a capsule surrounding the reactor, which is heated by the heated fluids.

In one embodiment of the disclosure, energy is conveyed to electrical resistors installed on the reactor, so that the reactor can be heated and its temperature brought to the desired one. Embodiments of the disclosure include the production of additional energy through a heat exchanger positioned after the thermal fluid heat exchanger and the exploitation of such additional energy to bring electricity to the electric resistors placed on the reactor. In one of the embodiments of the disclosure not all the energy is used to heat the thermal fluids and to bring energy to the electrical resistors, and the excess energy is wasted or sent directly to an additional energy recovery system.

Embodiments of the disclosure include a system to efficiently perform the pyrolysis of organic material. Such system may comprise a bin from where an organic material is put into a container called reactor, which is heated to a desired temperature ranging between 450° C. and 900° C., or less. In an embodiment of the disclosure, the system also comprises pipes where the organic material, after the pyrolysis has been completed, is separated between Syngas and carbonized material. One of the embodiments of the disclosure also comprises a combustion chamber where the Syngas, through a pipe, is sent after the pyrolysis has been completed in order to be burnt.

Embodiments of the disclosure include a thermal fluid heat exchanger containing thermal fluids (oils etc.) where exhaust gas resulting from the combustion of the Syngas is conveyed to in order to heat the fluids. One of the embodiments of the disclosure include a capsule surrounding the reactor where the heated fluid are sent from the thermal fluid heat exchanger. Embodiments of the present disclosure include electrical resistors placed on the reactor that are used to regulate the internal temperature of the reactor. Embodiments of the disclosure include an additional energy recovery system positioned after or before the thermal fluid heat exchanger that is used to produce, thanks to an organic Rankine cycle or to a Stirling electricity generation system, additional energy which is conveyed to the electrical resistors positioned on the reactor. In one embodiment of the disclosure a chimney is present and is positioned after all the heat exchangers in order to expel the exhaust gas.

This summary is provided to introduce a selection of concepts in a simplified form that are further described in the Detailed Description and drawings. This Summary is not intended to identify essential features of the claimed subject matter or to limit the scope of the claimed subject matter.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION OF THE INVENTION

Figure 1:
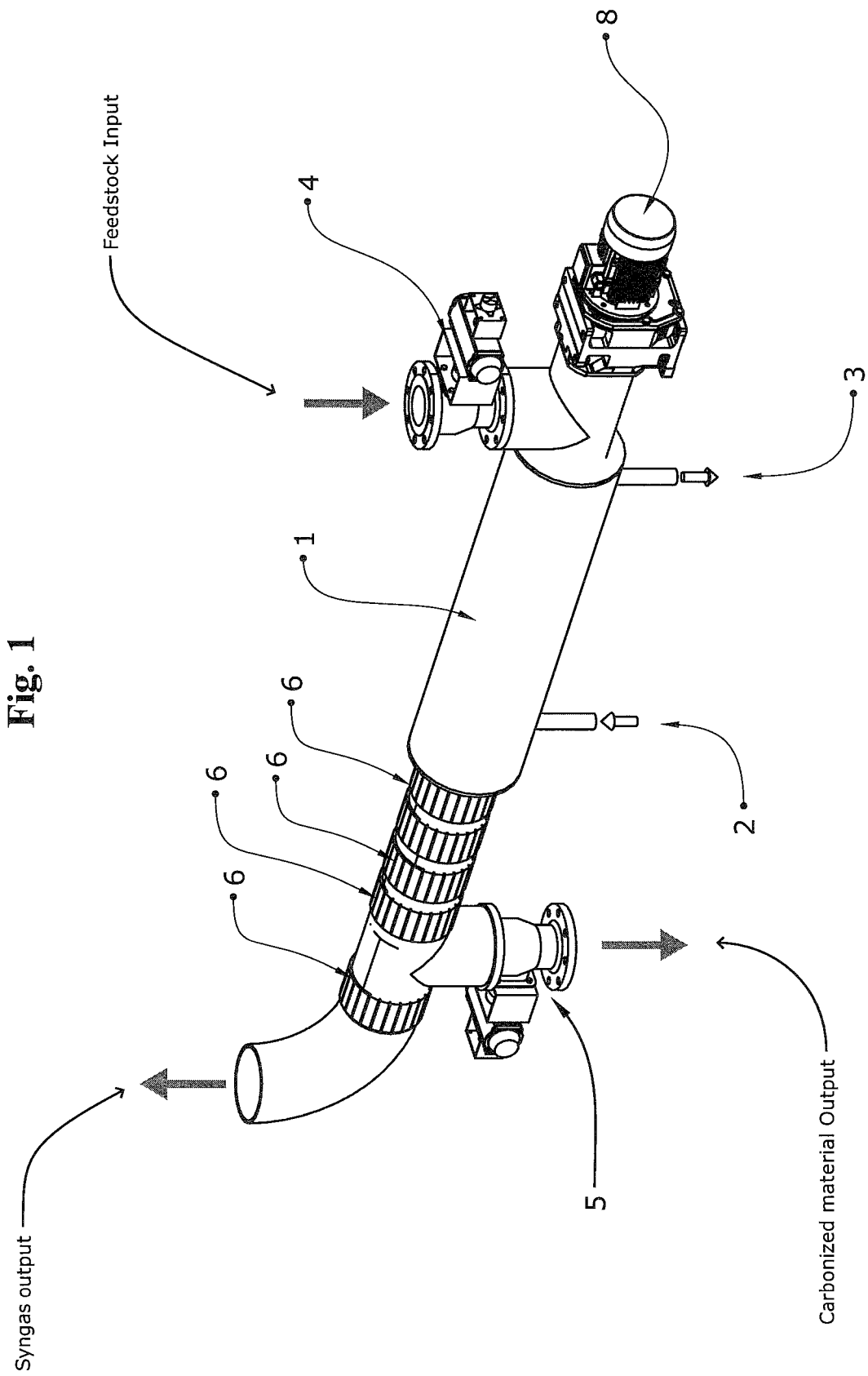
FIG. 1 provides an illustrative, prospective, representation of a reactor for hybrid pyrolysis method and system with highlighted heated fluid capsule, heated fluid entrance into the heated fluid capsule, heated fluid exit from the heated fluid capsule, valve for feedstock input, valve for feedstock output, electrical resistors, electrical motor for screw conveyor and screw conveyor.
Figure 2:
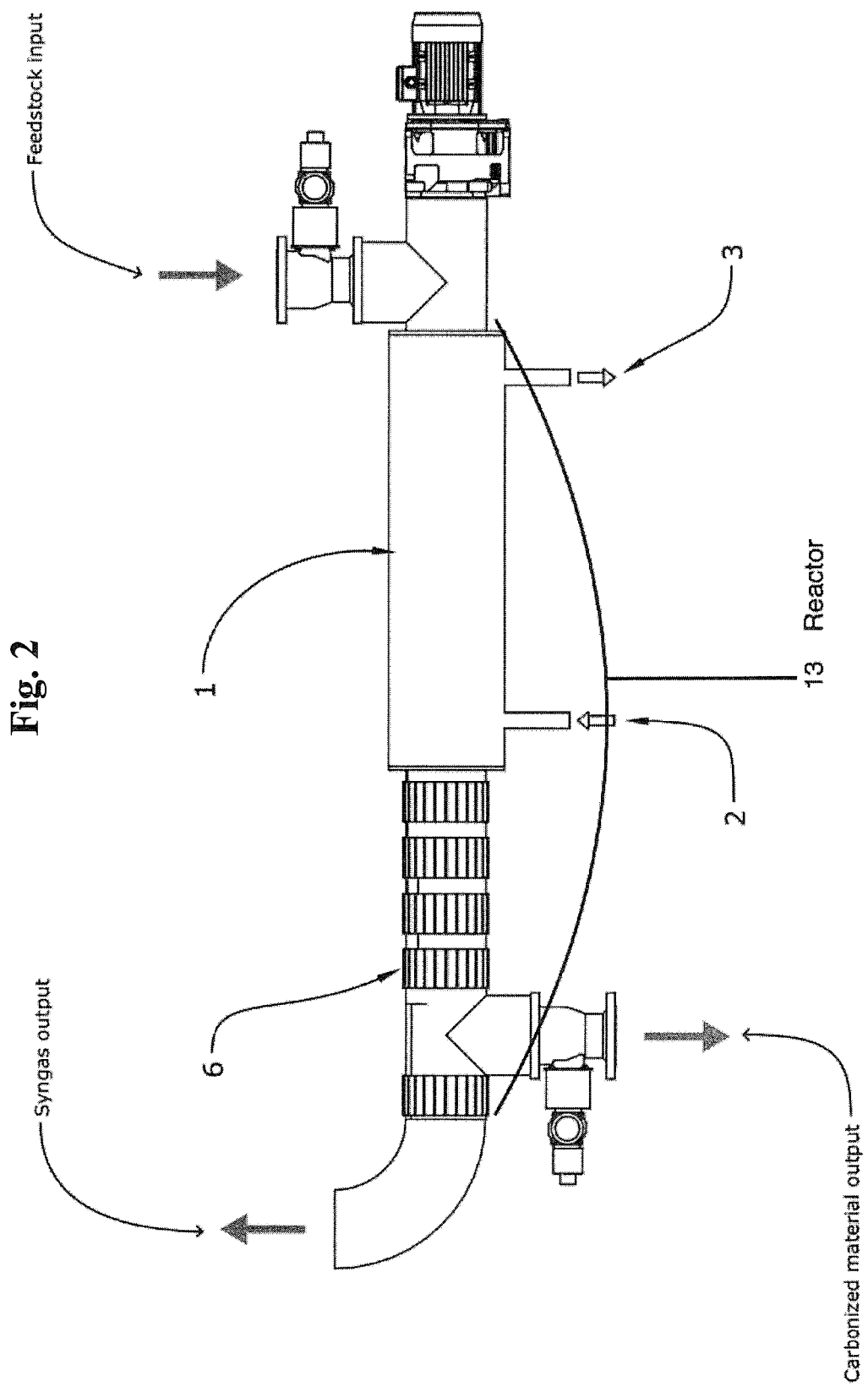
FIG. 2 shows the reactor of FIG. 1 from a lateral perspective with highlight on the same elements as in FIG. 1.
Figure 3:
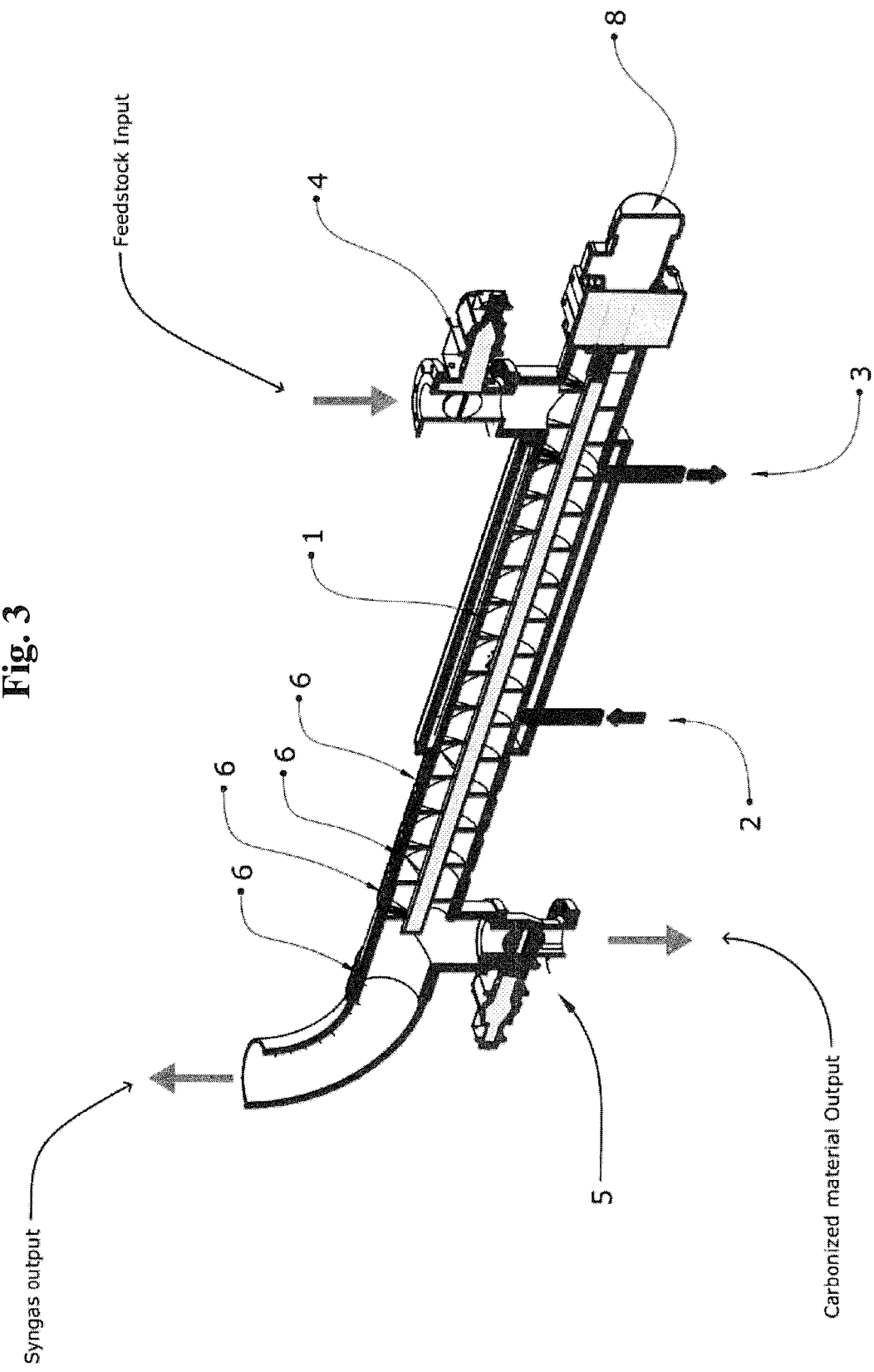
FIG. 3 contains a section of the reactor represented in FIG. 1.
Figure 4:
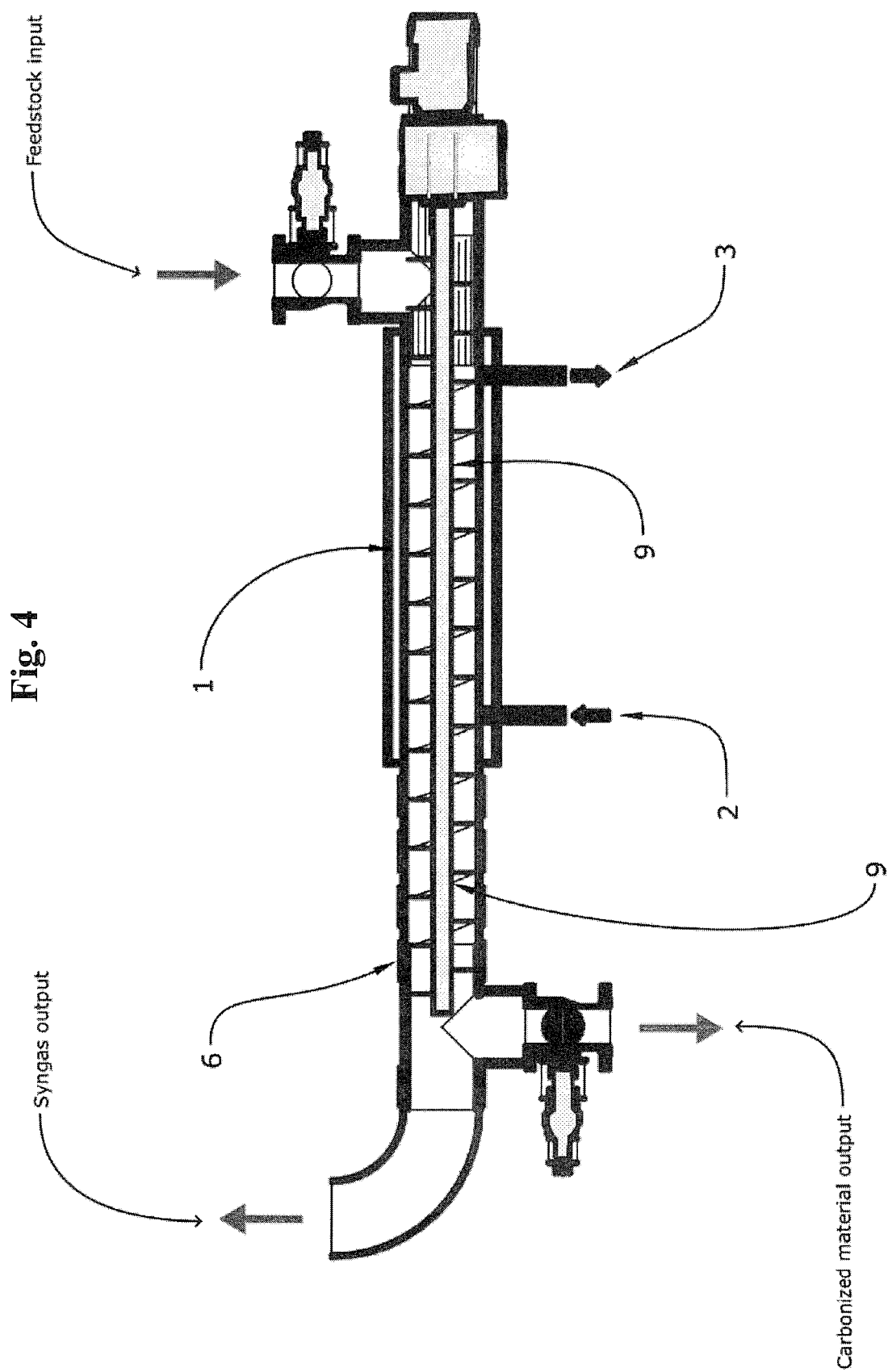
FIG. 4 contains a section of the reactor represented in FIG. 2.
Figure 5:
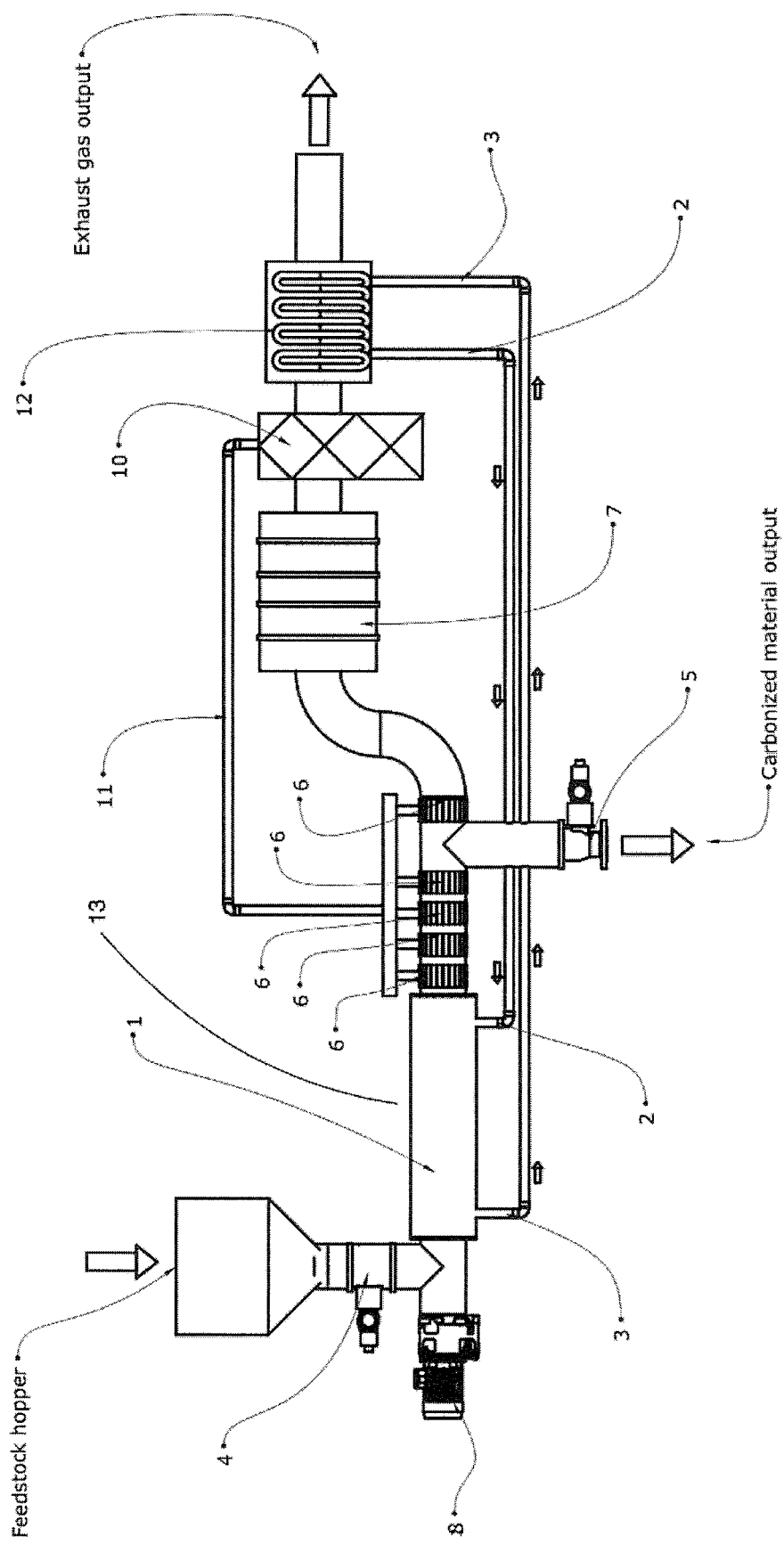
FIG. 5 provides an illustrative representation of the fundamental components of the hybrid pyrolysis method and systems, which includes the elements which are present in FIGS. 1 to 4 but it is completed with other components of the disclosure.

As already mentioned in the Background, systems and methods for performing the pyrolysis of organic materials have been invented a long time ago, and there are actually many ways to perform pyrolysis.

Three of the most common and commercially frequent ways in which pyrolysis of organic material is carried out have been referenced to in the Background, but all of them have one or more disadvantageous properties which make them non-economically viable, due to excess of energy which is required to perform the pyrolysis in a way which allows to obtain a resulting carbonized material that can be reused and it is therefore of good quality.

The present disclosure aims at solving the aforementioned inefficiency and quality problems.

Embodiments of the disclosure include a method to efficiently carry out the pyrolysis of organic material. In one of the embodiments, such method may be performed through the injection of organic material in a container, also called reactor 13, which is heated to a desired temperature ranging between 450° C. and 900° C., or less. In one embodiment of the disclosure, once the organic material is inserted into the reactor, through a screw conveyor 9 whose functioning depends upon an electrical motor 8 and which is positioned on the side of the reactor 13 where the organic material is inserted, such material is pushed on the other side of the reactor 13.

In one of the embodiments of the disclosure, while the organic material is pushed from the first part of the reactor 13, i.e. the side where the organic material is released into the reactor 13, to the second part of the reactor 13, i.e. the one which is on the opposite side of where the organic material is inserted in the reactor 13, thanks to the action of the screw conveyor 9, such organic material is heated to a desired temperature ranging between 450° C. and 900° C. in order for the pyrolysis to be carried out.

In an embodiment of the disclosure, the organic material is heated through the combined action, on the first part of the reactor 13, of a capsule 1 which surrounds the first part of the reactor 13 and which is filled with heated thermal fluids, and on the second part of the reactor 13, through one or more electrical resistors 6 which are positioned around the second part of the reactor 13. In one embodiment of the disclosure, the internal temperature of the first part of the reactor 13 is brought to a range between 200 and 380° C. thanks to the heated thermal fluids contained in the capsule 1 which surrounds such first part of the reactor 13, while the second part of the reactor 13 is heated through one or more electrical resistors 6, so that the organic material reaches a temperature ranging from 450° C. to 900° C. and the pyrolysis is carried out.

In an embodiment of the disclosure, after the pyrolysis in the reactor 13 has been carried out at a desired temperature ranging between 450 and 900° C., the organic material is then separated, as a result of the pyrolysis, between Syngas and carbonized material. In an embodiment of the disclosure, the Syngas is sent, through a connection pipe, to a combustion chamber 7 where it is burnt and the carbonized material is expelled through a pipe whose end has a valve for feedstock output 5. In an embodiment of the disclosure, through the combustion of Syngas into the combustion chamber 7, electricity is produced through an electricity generation module 10 which exploits the exhaust gas coming out from the combustion chamber 7 and which is positioned after the combustion chamber 7, to which it is connected through a pipe.

In one of the embodiments of the disclosure, the exhaust gas that is produced after the combustion of the Syngas in the combustion chamber 7 is then used to heat thermal fluids thanks to a thermal fluids exchanger 12; thermal fluids are heated up to 380° C. In an embodiment of the disclosure, thanks to a pipe 2 coming out from the thermal fluid exchanger 12, connected to the capsule 1 and positioned close to where one or more electrical resistors 6 are positioned, heated thermal fluids are conveyed into the capsule 1 which surrounds the first part of the reactor 13 and are used to bring the first part of the reactor 13 to an internal temperature ranging from 200 to 380° C. Thanks to a pipe coming out from the capsule 1 which surrounds the first part of the reactor 13 and which is positioned close to where the organic material is inserted into the reactor, the heated thermal fluids, once their temperature drops of approximately 30° C., are sent back to the thermal fluids exchanger 12 in order to be heated again thanks to the thermal fluid exchanger 12.

In one embodiment of the disclosure, the internal temperature and humidity of the reactor, of the heated thermal fluid, of the thermal fluid to be heated, of the combustion chamber, and of the exhaust gas that comes out of the combustion chamber and of the exhaust gas that comes out from the electricity generation system are measured by sensors. In embodiments of the disclosures, there are actuators that open and close all the valves in the system and that can be controlled remotely thanks through a software which runs on a server. Such software program collects and monitors all the data from the sensors and the actuators.

In an embodiment of the disclosure, the flow of the Syngas that goes to the combustion chamber and the flow of exhaust gas resulting from the combustion of the Syngas are regulated by the software based upon a given set of parameters, in order to convey the right amount of energy to the electricity generation system and to the thermal fluid heat exchanger. In an embodiment of the disclosure, the distribution of energy to be conveyed to the electrical resistors positioned on the reactor and of the amount of heated thermal fluid to be conveyed to the capsule on the reactor are also managed
by the software, based on the moisture content and energy demand for the reactor. In one embodiment of the disclosure, the insertion of organic material into the reactor and the movement of the organic material during the process of pyrolysis from one side of the other of the reactor through the motor-powered and rotating screw conveyor is controlled by the software, based on the inside temperature and humidity of the reactor. In one embodiment of the disclosure when the output of the pyrolysis process is ready is decided by the software based on a given set parameters. In an embodiment of the disclosure, the energy demand of the reactor is calculated based on the temperatures readings on the reactor itself. In one embodiment of the disclosure the software regulates the entire energy balance of the method in order to maximize energy efficiency and to obtain the highest quality of carbonized material that results from the pyrolysis.

Embodiments of the disclosure include a system to efficiently carry out the pyrolysis of organic material. Such system is comprised a container, also called reactor 13, where organic material is inserted from a bin, wherein said reactor is heated to a desired temperature ranging between 450° C. and 900° C., or less. In one embodiment of the disclosure, the system comprises a screw conveyor 9 whose functioning depends upon an electrical motor 8 and which is positioned on the side of the reactor 13 where the organic material is inserted, and once the organic material is inserted into the reactor, such material is pushed on the other side of the reactor 13.

In one of the embodiments of the disclosure, the system comprises a screw conveyor which pushes the organic material from the first part of the reactor 13, i.e. the side where the organic material is released into the reactor 13, to the second part of the reactor 13, i.e. the one which is on the opposite side of where the organic material is inserted in the reactor 13, and such organic material is heated to a desired temperature ranging between 450° C. and 900° C. in order for the pyrolysis to be carried out.

In an embodiment of the disclosure, the system comprises a capsule 1 which surrounds the first part of the reactor 13 and which is filled with heated thermal fluids and, on the second part of the reactor 13, one or more electrical resistors 6 which are positioned around the second part of the reactor 13 heat the organic material. In one embodiment of the disclosure, heated thermal fluids contained in the capsule 1 which surrounds such first part of the reactor being the internal temperature of the first part of the reactor 13 to a range between 200 and 380° C., while one or more electrical resistors heat the second part of the reactor 13, so that the organic material reaches a temperature ranging from 450° C. to 900° C. and the pyrolysis is carried out.

In an embodiment of the disclosure, after the pyrolysis in the reactor 13 has been carried out at a desired temperature ranging between 450° C. and 900° C., the system comprises Syngas and carbonized material which are obtained through the separation of the organic material is then separated, as a result of the pyrolysis. An embodiment of the disclosure comprises a connection pipe through which the Syngas is conveyed from the reactor, a combustion chamber 7 where the Syngas coming from the reactor is burnt, a carbonized material that is expelled after the pyrolysis and a pipe whose end has a valve for feedstock output 5 and through which the carbonized material is expelled. In an embodiment of the disclosure, the system comprises a combustion chamber which burns the Syngas in the combustion chamber 7, an electricity generation module 10 through which electricity is produced by exploiting the exhaust gas coming out from the combustion chamber 7 and which is positioned after the combustion chamber 7 and a pipe which connects the electricity generation module to the combustion chamber.

In one of the embodiments of the disclosure, the system comprises thermal fluids and a thermal fluids exchanger where thermal fluids are contained, wherein the thermal fluids are heated through the exhaust gas that is produced after the combustion of the Syngas in the combustion chamber up to 380° C. In an embodiment of the disclosure, the system comprises a pipe 2 coming out from the thermal fluid exchanger 12 and which is connected to the capsule 1 and positioned close to where one or more electrical resistors 6 are positioned, and through said pipe heated thermal fluids are conveyed into the capsule 1 which surrounds the first part of the reactor 13 and are used to bring the first part of the reactor 13 to an internal temperature ranging from 200 to 380° C. An embodiment of the disclosure includes a system comprising a pipe coming out from the capsule 1 which surrounds the first part of the reactor 13 and which is positioned close to where the organic material is inserted into the reactor and through said pipe the heated thermal fluids, once their temperature drops of 30° C., are sent back to the thermal fluids exchanger 12 in order to be heated again thanks to the thermal fluid exchanger 12.

In one embodiment of the disclosure, the system comprise sensors that measure the internal temperature and humidity of the reactor, of the heated thermal fluid, of the thermal fluid to be heated, of the combustion chamber, and of the exhaust gas that comes out of the combustion chamber and of the exhaust gas that comes out from the electricity generation system. In embodiments of the disclosures, the system comprises actuators that open and close all the valves in the system and a software, running on a server, that controls remotely valves and actuators based on a set of given parameters. In one of the embodiments, such software program collects and monitors all the data from the sensors and the actuators.

In an embodiment of the disclosure, the software regulates the flow of the Syngas that goes to the combustion chamber and the flow of exhaust gas resulting from the combustion of the Syngas based on a given set of parameters, in order to convey the right amount of Syngas to the combustion chamber and the right amount of energy to the electricity generation system and to the thermal fluid heat exchanger. In an embodiment of the disclosure the software also manages the distribution of energy to be conveyed to the electrical resistors positioned on the reactor and of the amount of heated thermal fluid to be conveyed to the capsule on the reactor, based on the moisture content and energy demand for the reactor. In one embodiment of the disclosure, the software also controls the insertion of organic material into the reactor and the movement of the organic material during the process of pyrolysis from one side of the other of the reactor through the motor-powered and rotating screw conveyor, based on the inside temperature and humidity of the reactor. In one embodiment of the disclosure the software based on a given set parameters decides when the output of the pyrolysis process is ready and also calculates the energy demand of the reactor based on the temperature readings on the rector itself. In one embodiment of the disclosure, the system comprises a software that regulates the entire energy balance of the system in order to maximize energy efficiency and to obtain the highest quality of carbonized material that results from the pyrolysis.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

What is claimed is:

1. A system for performing pyrolysis of organic material into syngas and carbonized material, comprising:
   a reactor through which organic material is conveyed from an upstream end toward a downstream end and within which said pyrolysis will occur;
   said reactor comprising a first part and a second part, wherein the temperature within said first part of said reactor is within the range of 200-380° C., while the temperature within said second part of said reactor is within the range of 450-900° C., whereby syngas and carbonized material are produced as a result of said pyrolysis within said reactor, and wherein the first part and the second part together form a single continuous vessel;
   a plurality of electrical resistors disposed around said second part of said reactor for heating said second part of said reactor to said temperature level within said range of 450-900° C.;
   a combustion chamber fluidically connected to said downstream end of said second part of said reactor for receiving said syngas from said second part of said reactor;
   a thermal fluid heat exchanger fluidically connected to said combustion chamber for receiving exhaust gases from said combustion chamber which will heat thermal fluids disposed within said thermal fluid heat exchanger;
   a capsule surrounding said first part of said reactor and into an internal portion of which heated thermal fluids are disposed for heating said first part of said reactor;
   a first fluid conduit fluidically connecting said thermal fluid heat exchanger to said capsule of said first part of said reactor so as to conduct heated thermal fluids from said thermal fluid heat exchanger into said internal portion of said capsule so as to heat said first part of said reactor;
   a second fluid conduit fluidically connecting said capsule of said first part of said reactor to said thermal fluid heat exchanger for conducting thermal fluids from said capsule of said first part of said reactor back to said thermal fluid heat exchanger such that said thermal fluids conducted back to said thermal fluid heat exchanger can again be heated within said thermal fluid heat exchanger and conducted back to said capsule of said first part of said reactor so as to heat said first part of said reactor in a recirculated mode of operation; and
   an output pipe fluidically connected to said downstream end of said second part of said reactor through which said carbonized material is outputted from said second part of said reactor.

2. The system as set forth in claim 1, further comprising:
   an electrical generator, connected to said combustion chamber, for producing electricity as a result of said combustion of said syngas within said combustion chamber.

3. A method for performing pyrolysis of organic material into syngas and carbonized material, comprising the steps of:
   providing a reactor through which organic material is conveyed from an upstream end toward a downstream end and within which said pyrolysis will occur, wherein said reactor comprises a first part and a second part, wherein the temperature within said first part of said reactor is within the range of 200-380° C., while the temperature within said second part of said reactor is within the range of 450-900° C., whereby syngas and carbonized material are produced as a result of said pyrolysis within said reactor, and wherein the first part and the second part together form a single continuous vessel;
   fluidically connecting a combustion chamber to said downstream end of said second part of said reactor for receiving said syngas from said second part of said reactor;
   fluidically connecting a thermal fluid heat exchanger to said combustion chamber for receiving exhaust gases from said combustion chamber which will heat thermal fluids disposed within said thermal fluid heat exchanger;
   providing a capsule around said first part of said reactor and into an internal portion of which heated thermal fluids are disposed for heating said first part of said reactor;
   fluidically connecting a first fluid conduit from said thermal fluid heat exchanger to said capsule of said first part of said reactor so as to conduct heated thermal fluids from said thermal fluid heat exchanger into said internal portion of said capsule so as to heat said first part of said reactor;
   fluidically connecting a second fluid conduit of said capsule of said first part of said reactor to said thermal fluid heat exchanger for conducting thermal fluids from said capsule of said first part of said reactor back to said thermal fluid heat exchanger such that said thermal fluids conducted back to said thermal fluid heat exchanger can again be heated within said thermal fluid heat exchanger and conducted back to said capsule of said first part of said reactor so as to heat said first part of said reactor in a recirculating mode of operation; and
   fluidically connecting an output pipe to said downstream end of said second part of said reactor through which said carbonized material is outputted from said second part of said reactor.

4. The method as set forth in claim 3, further comprising the step of:
> fluidically connecting an electrical generator to said combustion chamber for producing electricity as a result of said combustion of said syngas within said combustion chamber.

\* \* \* \* \*